(12) United States Patent
Hayakawa et al.

(10) Patent No.: US 8,451,011 B2
(45) Date of Patent: May 28, 2013

(54) ELECTROSTATIC CAPACITY-TYPE SENSOR

(75) Inventors: Tomonori Hayakawa, Komaki (JP); Kazunobu Hashimoto, Nagoya (JP)

(73) Assignee: Tokai Rubber Industries, Ltd., Komaki (JP)

( * ) Notice: Subject to any disclaimer, the term of this patent is extended or adjusted under 35 U.S.C. 154(b) by 798 days.

(21) Appl. No.: 12/155,387

(22) Filed: Jun. 3, 2008

(65) Prior Publication Data
US 2009/0015270 A1  Jan. 15, 2009

(30) Foreign Application Priority Data

Jul. 12, 2007  (JP) ................ 2007-183091

(51) Int. Cl.
*G01R 27/26* (2006.01)
(52) U.S. Cl.
USPC ........................................ 324/658
(58) Field of Classification Search
None
See application file for complete search history.

(56) References Cited

U.S. PATENT DOCUMENTS

| | | | |
|---|---|---|---|
| 3,814,998 A | 6/1974 | Thoma et al. | |
| 5,424,650 A * | 6/1995 | Frick | 324/688 |
| 5,652,395 A * | 7/1997 | Hirano et al. | 73/849 |
| 7,323,885 B2 * | 1/2008 | Gutendorf | 324/663 |
| 7,563,393 B2 * | 7/2009 | Hayakawa et al. | 252/500 |
| 7,694,582 B2 * | 4/2010 | Hayakawa et al. | 73/849 |
| 7,703,333 B2 * | 4/2010 | Hayakawa et al. | 73/849 |
| 2004/0055396 A1 * | 3/2004 | Morimoto | 73/862.045 |
| 2008/0009837 A1 * | 1/2008 | Miesel | 604/891.1 |
| 2008/0066564 A1 | 3/2008 | Hayakawa et al. | |
| 2008/0067477 A1 | 3/2008 | Hayakawa et al. | |
| 2008/0100046 A1 | 5/2008 | Hayakawa et al. | |

FOREIGN PATENT DOCUMENTS

| | | |
|---|---|---|
| JP | A-54-093498 | 7/1979 |
| JP | A-58-042901 | 3/1983 |
| JP | A-59-054904 | 3/1983 |
| JP | A 5-288619 | 11/1993 |
| JP | A-11-241903 | 9/1999 |
| JP | A 2005-315831 | 11/2005 |
| WO | WO 2006/091631 A2 | 8/2006 |

OTHER PUBLICATIONS

Extended European Search Report issued in European Patent Application No. 08 00 9644.9 on Oct. 28, 2009.
"Rubber-Based Nanocomposites for Touch Sensor," The Journal of the Society of Rubber Science and Technology, 2002, pp. 156-161, vol. 75, No. 4, Japan.
Jul. 3, 2012 Office Action issued in Japanese Patent Application No. 2007-183091 (with English Translation).

* cited by examiner

*Primary Examiner* — Jeff Natalini
(74) *Attorney, Agent, or Firm* — Oliff & Berridge, PLC

(57) ABSTRACT

An object of the present invention is to provide an electrostatic capacity-type sensor which is excellent in durability and can detect bending-deformation. An electrostatic capacity-type sensor comprises a dielectric film made of an elastomer and a pair of electrodes arranged via the dielectric film, and detects the deformation based on a change in the electrostatic capacity between the pair of electrodes. The pair of electrodes have an elastomer and a conductive filler blended in said elastomer, and are expansible/contractible depending on the deformation of the dielectric film, and exhibit a small change in the conductivity even when expanded and contracted.

6 Claims, 19 Drawing Sheets

$$Z = \frac{1}{\sqrt{(1/R)^2 + (\omega C)^2}} \quad \cdots \text{Equation (II)}$$

Concave bending     Initial state (Length L0)     Convex bending

Fig. 17

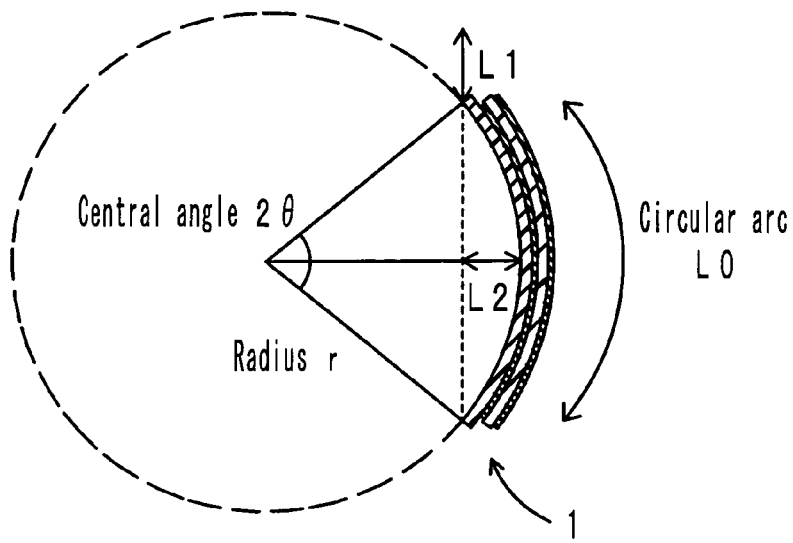

Method of calculating deflection amount L2

In the above figure,

From $2\pi r \times 2\theta/2\pi = L0$, we obtain $r = L0/2\theta$ ···Equation (a)

$r\cos\theta = r - L2 = L0/2\theta \cdot \cos\theta$ ···Equation (b)

$r\sin\theta = (L0-L1)/2 = L0/2\theta \cdot \sin\theta$ ···Equation (c)

From the equations (a) and (b), we obtain $L0/2\theta - L2 = L0/2\theta \cdot \cos\theta$ Thus, $L2 = L0/2\theta \cdot (1-\cos\theta)$ ···Equation (d)

From the equation (c), we obtain $\sin\theta/\theta = (L0-L1)/L0$ ···Equation (e)

ELECTROSTATIC CAPACITY-TYPE SENSOR

INCORPORATION BY REFERENCE

This application is based on and claims priority under 35 U.S.C. 119 with respect to Japanese Patent Application No. 2007-183091, which was filed on Jul. 12, 2007, and the entire content of which is incorporated herein by reference.

BACKGROUND OF THE INVENTION

1. Field of the Invention

The present invention relates to an electrostatic capacity-type sensor for detecting a deformation based on a change in the electrostatic capacity between a pair of electrodes.

2. Description of the Related Art

According to an electrostatic capacity-type sensor, utilizing a change in electrostatic capacity associated with a change in distance between a pair of electrodes, a compressive deformation can be detected. For example, Japanese Unexamined Patent Publication (KOKAI) No. 5-288619 discloses an electrostatic capacity-type tactile sensor including a pair of metal electrodes facing each other across a space. Further, Japanese Unexamined Patent Publication (KOKAI) No. 2005-315831 discloses an electrostatic capacity-type pressure sensor in which electrodes made of conductive cloth are arranged on both the surface of a sheet-shaped dielectric.

According to the electrostatic capacity-type sensor disclosed in Japanese Unexamined Patent Publication (KOKAI) No. 5-288619, a high dimensional accuracy is required in the distance between the electrodes, so that the manufacturing cost is high. Further, a metal material is used in the electrodes. The metal electrodes have little expansion/contraction properties, so that, for example, when the electrode is bent, the electrode is easy to be broken due to plastic deformation. Also, when the electrostatic capacity-type sensor is formed by placing an elastically deformable dielectric between the metal electrodes, the dielectric can be deformed by bending, but the electrodes cannot follow the deformation of the dielectric. Hence, the electrode and the dielectric are separated from each other, so that the use of them cannot be repeated. In such a way, the electrostatic capacity-type sensor including the metal electrodes is not suitable to detect the bending deformation. Further, the sensor is difficult to be attached to a curved shape.

On the other hand, the electrostatic capacity-type sensor disclosed in Japanese Unexamined Patent Publication (KOKAI) No. 2005-315831 uses an electrically-conductive cloth (conductive cloth) for the electrodes. The conductive cloth has expansion/contraction properties. However, the expansion/contraction direction is restricted by weaving method. Further, the conductive cloth has a stitch, so that the area of the electrode becomes small by the clearance of the stitch to cause the electrostatic capacity to become small.

SUMMARY OF THE INVENTION

The present invention has been developed in view of such circumstances, and it is an object of the invention to provide an electrostatic capacity-type sensor which has an excellent durability and can detect a bending-deformation.

(1) An electrostatic capacity-type sensor of the present invention comprises a dielectric film made of an elastomer and a pair of electrodes arranged via the dielectric film, wherein the pair of electrodes have an elastomer and a conductive filler blended in the elastomer, and are expansible/contractible depending on the deformation of the dielectric film, and exhibit a small change in the conductivity even when expanded/contracted, and a deformation is detected based on a change in the electrostatic capacity between the pair of electrodes.

Generally, the electrostatic capacity (capacitance) in an electrostatic capacity-type sensor having a dielectric arranged between a pair of electrodes can be determined by the following equation (I):

$$C = \epsilon_0 \epsilon_r S / d \quad \quad (I)$$

Where C: capacitance, $\epsilon_0$: dielectric constant in vacuum, $\epsilon_r$: specific dielectric constant of dielectric, S: electrode area, d: distance between electrodes.

As apparent from the equation (I), with respect to a strain inputted from outside, the larger the electrode area (S), the larger the capacitance (C) becomes. The smaller the thickness of a dielectric, that is, the distance between electrodes (d), the larger the capacitance (C) becomes.

According to the electrostatic capacity-type sensor of the present invention, a dielectric film made of elastomer is arranged between a pair of electrodes. The specific dielectric constant of the elastomer is larger than that of air. In other words, in the above-mentioned equation (1), $\epsilon_r$ becomes large. Hence, the capacitance (C) becomes larger compared to that of the sensor including a pair of electrodes simply facing each other across a space, thereby allowing the detecting sensibility to be improved.

Further, a pair of electrodes use an elastomer as a base material. Hence, they are flexible and thus can be deformed integrally with the dielectric film. In other words, they, even when deformed by bending, can be deformed following to the deformation of the dielectric film. The term "deformation" in this specification includes all of the deformations due to compression, expansion/contraction, bending and the like. In such a way, a pair of electrodes are expansible/contractible depending to the deformation of the dielectric film, so that they can also be easily attached to a curved shape. Further, even when used repeatedly, the electrode and the dielectric film are difficult to be separated from each other, so that they are excellent in durability.

Further, a pair of electrodes use an elastomer as a base material, so that unlike the electrodes made of cloth, they are thick. In addition, they have good conductive properties and change a little in the conductive properties even when expanded/contracted, as a result of forming a conducting path by the conductive filler later described. Therefore, the function as electrodes is difficult to be degraded even when the deformation amount of the dielectric film is large.

Further, both the dielectric film and electrodes are formed of an elastomer, so that they are flexible as a whole of the sensor, and excellent in processability to cause a high degree of freedom in shape design. Thus, the electrostatic capacity-type sensor of the present invention can be widely used as a soft sensor. Further, the sensor is flexible, so that it can accommodate for even a case where the deformation amount is large, thereby providing a large detection range.

Meanwhile, when an elastomer is arranged between the electrodes, the elastomer expands at a high temperature, so that the distance between the electrodes becomes larger. Hence, the capacitance becomes smaller by that extended distance fraction. In such a way, the capacitance changes at a high temperature due to factors other than deformation, so that deformation is difficult to be precisely detected. With this respect, according to the electrostatic capacity-type sensor of the present invention, the deformation can be precisely detected by correcting the change in film thickness due to temperature.

Although described in detail in the following embodiments, according to a change of impedance versus frequency (alternating current resistance) in the electrostatic capacity-type sensor of the present invention, the impedance decreases with the increase of temperature in the low-frequency range. This is because in the low-frequency range, a direct current resistance (R) component affects more largely the impedance than a capacitance (C) component. In other words, in the low-frequency range, R decreases with the increase of temperature to cause the impedance to be decreased. Thus, understanding a relationship between temperature and R in the low-frequency range allows an increased fraction of the film thickness of the elastomer at a high temperature to be corrected (self-temperature compensation function). In such a way, according to the electrostatic capacity-type sensor of the present invention, using the self-temperature compensation function, the deformation can be precisely detected without depending on the temperature of working environment.

(2) Preferably, in the construction of the above-mentioned (1), the pair of electrodes consist of an elastomer composition including the elastomer and the conductive filler, and in a percolation curve indicating a relationship between a blending amount of the conductive filler and an electric resistance of the elastomer composition, the blending amount (critical volume fraction: $\phi c$) of the conductive filler at a first flexure point, at which electric resistance lowers to cause a transition between insulator and conductor, is 25 vol % or less.

Generally, when a conductive filler is mixed in an elastomer having insulation properties to form an elastomer composition, the electric resistance of the elastomer composition changes depending on a blended amount of the conductive filler. FIG. 1 shows typically the relationship between the blended amount of the conductive filler and the electric resistance in the elastomer composition.

As shown in FIG. 1, as a conductive filler 102 is mixed in an elastomer 101, at first the electric resistance of the elastomer composition is hardly different from that of the elastomer 101. However, when the amount of the conductive filler 102 reaches a volume fraction, the electric resistance rapidly drops, thereby causing insulator-conductor transition (a first flexure point). The amount of the conductive filler 102 at the first flexure point is called a critical volume fraction ($\phi c$). Also, as the conductive filler 102 is further mixed, a change in electric resistance becomes smaller from a point of a certain volume fraction to cause the change in electric resistance to be saturated (a second flexure point). The amount of the conductive filler 102 at the second flexure point is called a saturated volume fraction ($\phi s$). Such a change in electric resistance is called a percolation curve, which is considered to be due to a fact that a conducting path P1 by the conductive filler 102 is formed in the elastomer 101.

For example, when the primary particles of the conductive filler are agglomerated to cause achieving of secondary particles to proceed, the conducting path is easy to be formed by a three-dimensional network structure. In such a case, the critical volume fraction ($\phi c$) of the elastomer composition becomes a relatively as small as about 20 vol %. In other words, when the critical volume fraction ($\phi c$) is small, the conductive filler is easy to form a secondary aggregate having structure properties. Hence, even when the amount of the conductive filler is relatively small, an elastomer composition having high electrical conductivity can be obtained.

According to the present construction, a pair of electrodes consist of an elastomer composition whose critical volume fraction ($\phi c$) is 25 vol % or less. Since the critical volume fraction ($\phi c$) is relatively small, the conductive filler is easy to form an aggregate. Thus, with a relatively small amount of conductive filler, electrodes having good electrical conductivity can be obtained. Further, "the elastomer composition" in this specification includes a mixture of elastomer and conductive filler, as well as a mixture of elastomer, conductive filler, other additives and the like.

(3) Preferably, in the construction of the above-mentioned (1), the conductive filler is formed of carbon material. The carbon material has good electrical conductivity, and it is relatively inexpensive. Hence, using the conductive filler formed of carbon material allows a cost required for manufacturing an electrostatic capacity-type sensor to be reduced.

(4) Preferably, in the construction of the above-mentioned (1), the elastomer as a material of the dielectric film includes one or more compounds selected from the group consisting of silicone rubber, acrylonitrile-butadiene copolymer rubber, acrylic rubber, epichlorohydrin rubber, chlorosulfonated polyethylene, chlorinated polyethylene, and urethane rubber. These elastomers have a high specific dielectric constant, thereby allowing the capacitance to be made large.

(5) Preferably, in the construction of the above-mentioned (1), the elastomer as a material of the pair of electrodes includes one or more compounds selected from the group consisting of silicone rubber, ethylene-propylene copolymer rubber, natural rubber, styrene-butadiene copolymer rubber, acrylonitrile-butadiene copolymer rubber, acrylic rubber, epichlorohydrin rubber, chlorosulfonated polyethylene, chlorinated polyethylene, and urethane rubber. These elastomers have good expansion/contraction properties, so that they can be deformed integrally with dielectric films.

(6) Preferably, in the construction of the above-mentioned (1), a restraint member for restraining an elastic deformation of a surface of at least one of the pair of electrodes, which is elastically bending-deformable, is arranged on the surface.

According to the present construction, the elastic deformation of at least one of the surfaces of electrode due to bending-deformation is restricted by the restraint member. This causes a change in the distance between electrodes during bending-deformation to become large. Hence, the bending-deformation is more easily detected.

(7) Preferably, in the construction of the above-mentioned (6), the restraint member for restraining an elastic deformation of a surface of one of the pair of electrodes is arranged on the surface, and during bending-deformation, the direction of the bending-deformation can be discriminated based on a change in the electrostatic capacity between the pair of electrodes.

Although described in detail in the following embodiments, for example, when the bending direction becomes reverse with respect to right and left, the changing behavior of the capacitance becomes reverse with respect to the deflection during bending-deformation. Thus, according to the electrostatic capacity-type sensor of the present invention, the bending direction can be discriminated based on the changing behavior of the capacitance.

(8) Preferably, in the construction of the above-mentioned (1), a pair of sensor elements including the dielectric film and the pair of electrodes are arranged on both respective sides of a plate-shaped, elastically bending-deformable reference member, and utilizing a fact that the increase/decrease of the film thickness of the dielectric film on both the sides of the reference member becomes reverse during bending-deformation, the bending-deformation is detected based on a difference between an electrostatic capacity change in one of the sensor elements and an electrostatic capacity change in the other of the sensor elements.

The reference member plays a role in restraining the elastic deformation of the surface of adjacent electrodes. During bending-deformation, a compressive or tensile stress is applied to the respective dielectric films arranged on both the sides of the reference member. This causes the increase/decrease of the film thickness of the dielectric film, that is, the increase/decrease of the distance between electrodes with respect to bending-deformation becomes reverse on both the sides of the reference member. Thus, even if the electrostatic capacity change in individual sensor elements is small, the bending-deformation is detected based on a difference between an electrostatic capacity change in one of the sensor elements and an electrostatic capacity change in the other of the sensor elements, thereby allowing the detection sensibility to be improved. In such a way, according to the present construction, there can be provided an electrostatic capacity-type sensor which has a high sensibility and provides little malfunction and erroneous discrimination.

(9) Preferably, in the construction of the above-mentioned (8), restraint members for restraining an elastic deformation of respective surfaces of the sensor elements are further arranged on the surfaces.

According to the present construction, the elastic deformation of respective surfaces of the sensor elements due to bending-deformation is restricted by the restraint member. This causes a change in the distance between electrodes to become large during bending-deformation. Hence, the bending-deformation is more easily detected.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

FIG. 17 is an explanatory view of the deflection amount L2 in the test.

DETAILED DESCRIPTION OF THE PREFERRED EMBODIMENT

Figure 1:
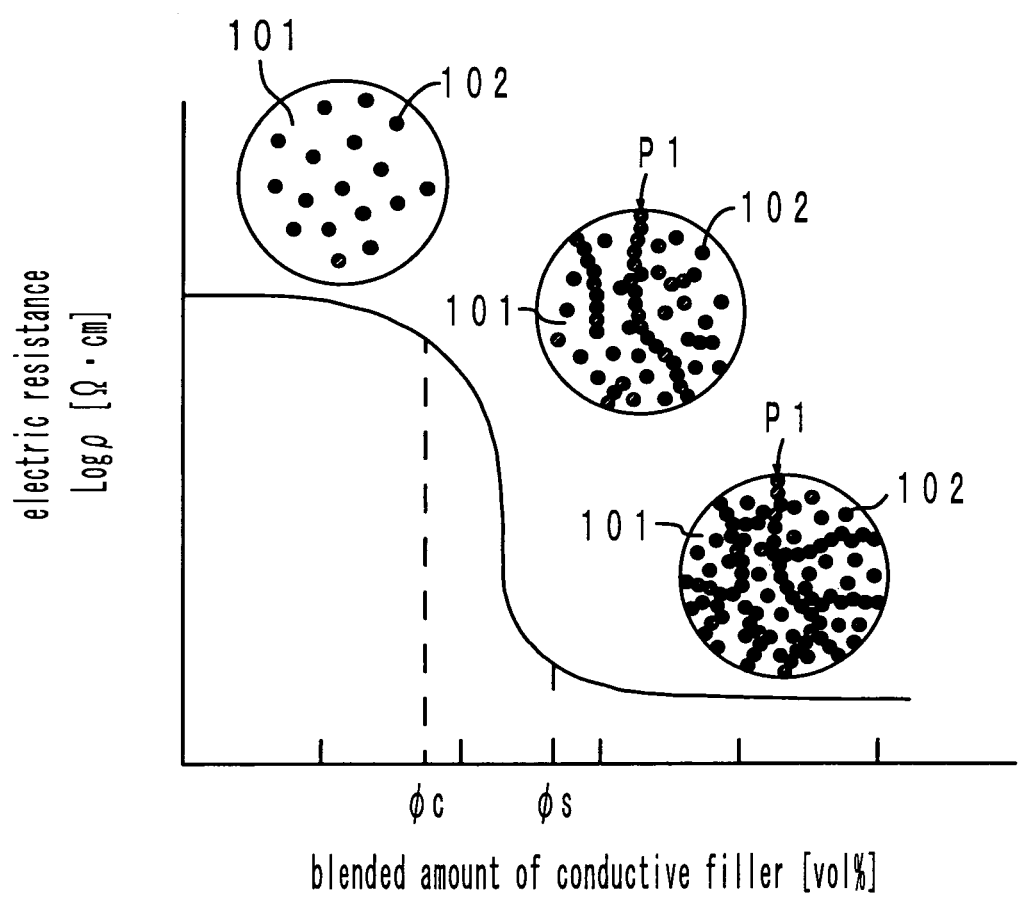
FIG. 1 is a pattern diagram of a percolation curve in an elastomer composition.

Having generally described the present invention, a further understanding can be obtained by reference to the specific preferred embodiments which are provided herein for the purpose of illustration only and not intended to limit the scope of the appended claims. The preferred embodiments of the electrostatic capacity-type sensor of the present invention will be explained as follows. First, the construction of the electrostatic capacity-type sensor of the present invention will be explained in detail, and then the examples of the embodiments will be explained.

<Construction of Electrostatic Capacity-Type Sensor>

The electrostatic capacity-type sensor of the present invention comprises a dielectric film made of an elastomer and a pair of electrodes arranged via the dielectric film. The elastomer forming the dielectric film can be selected as required from rubber and thermoplastic elastomers. The elastomer, which is not particularly limited, is desirable to have a high specific dielectric constant. More specifically, the specific dielectric constant at a room temperature is desirably 3 or more, more desirably 5 or more. It is most suitable to employ either an elastomer having a polar functional group, for example, such as an ester group, a calboxyl group, a hydroxyl group, a halogen group, an amide group, a sulfone group, an urethane group, and a nitrile group, or an elastomer into which a polar low-molecular weight compound having one of these polar functional groups is added. The elastomer may be crosslinked or not crosslinked. Suitable elastomers include, for example, such as silicone rubber, acrylonitrile-butadiene copolymer rubber, acrylic rubber, epichlorohydrin rubber, chlorosulfonated polyethylene, chlorinated polyethylene, and urethane rubber.

The film thickness of a dielectric film, which is not particularly limited, is desirable to be 1 μm or more and 3000 μm or less, in view of achieving a smaller size of the sensor, and of improving a detection sensibility by increasing the capacitance proportional to the inverse number of the film thickness. It is more suitable to be 50 μn or more and 500 μm or less.

A pair of electrodes are arranged, across the above-mentioned dielectric film, on the respective surfaces of the dielectric film. The elastomer forming the electrodes may be the same as the one used for the dielectric film, or be different from it. When the electrodes and the dielectric film are formed of the same elastomer, the follow-up ability of the electrodes to the deformation of the dielectric film is improved. Further, the adhesive properties of the dielectric film to the electrodes are also improved, so that even when subject to a repeated fatigue, the separation of the dielectric film from the electrodes is restrained to improve the reliability. Further, when the elastomer for electrodes is prepared to produce a mixture (elastomer composition) with the conductive filler, the elastomer for electrodes is desirable to use the elastomer composition whose critical volume fraction (φc) in the percolation curve is 25 vol % or less. When the critical volume fraction (φc) is 25 vol % or less, even if the amount of the conductive filler is relatively small, the electrodes having high electrical conductivity can be obtained. Elastomers suitable for electrodes include silicone rubber, ethylene-propylene copolymer rubber, natural rubber, styrene-butadiene copolymer rubber, acrylonitrile-butadiene copolymer rubber, acrylic rubber, epichlorohydrin rubber, chlorosulfonated polyethylene, chlorinated polyethylene, and urethane rubber and the like.

It is sufficient that the conductive filler blended in the elastomer is particles having electrically-conductive properties, and uses fine particles of carbon material or metal. It is sufficient to use one kind individually of these kinds of particles or use two or more kinds thereof by being mixed. For example, it is desirable to use carbon material because it is relatively cheap and easy to form a conductive path. As carbon material, for example, carbon black such as ketjen black is suitable because it has small particle size and excellent electrical conductivity.

The shape of the conductive filler is not particularly limited to spherical, needle-like, prismatic and the like. For example, the aspect ratio (ratio of long side to short side) of the conductive filler is desirable to be 1 or more. For example, using a needle-like conductive filler having a relatively large aspect ratio allows a three-dimensional conductive network to be easily made, whereby with a small amount thereof, high electrical conductivity can be realized. In addition, a change in electrically-conductive properties during the expansion/contraction of the electrodes can be restrained.

Further, when the conductive filler is selected, it is sufficient to consider the average particle diameter, the compatibility with the elastomer, and the like. For example, when a spherical conductive-filler is employed, the average particle diameter (primary particle) of the conductive filler is desirable to be 0.01 μm or more and 0.5 μm or less. When the diameter is less than 0.01 μm, the cohesiveness is high, the particle is difficult to be evenly dispersed when a coating material is prepared. Preferably, it is 0.03 μm or more. On the contrary, when it exceeds 0.5 μm, the aggregate (secondary particle) is hardly to be formed. Preferably, it is 0.1 μm or less. Further, a combination of the conductive filler and the elastomer, and an appropriate adjustment of the average particle diameter of the conductive filler allows the critical volume fraction (φc) in the percolation curve to be adjusted within a desirable range.

In order to realize desirable electrically-conductive properties, the conductive filler is desirable to be blended at a ratio of the critical volume fraction (φc) in the percolation curve or more. However, in view of establishing the expansion/contraction properties of the electrodes, it is desirable to blend a relatively small amount of the conductive filler, thereby realizing high electrical conductivity. For example, the packing rate of the conductive filler is desirable to be 25 vol % or less assuming that the volume of the electrode is 100 vol %. The packing rate of 15 vol % or less is more suitable. On the other hand, when the packing rate of the conductive filler exceeds 30 vol %, a mixing with the elastomer becomes difficult to cause the molding processability to be reduced. In addition, the expansion/contraction properties of the electrodes is reduced. Hence, it is desirable to be 30 vol % or less.

The film thickness of a dielectric film, which is not particularly limited, is desirable to be 1 μm or more and 100 μm or less, in view of considering of a follow-up ability to the dielectric film, and of achieving a smaller size of the sensor. Further, in order to improve the follow-up ability to the deformation of the dielectric film, the Young's modulus is desirable to be 0.1 MPa or more and 10 MPa or less. Similarly, the elongation at breaking in the tensile test (JIS K6251) is desirable to be 200% or more.

Further, the electrical resistance of the electrodes in the thickness direction and the surface direction is desirable to be 100 kΩ or less, and more suitable to be 10 kΩ or less. Now, the electrode, even when expanded/contracted, is small in the change of electrically-conductive properties. For example, when the electrode is extended in one direction to extend the distance between terminals by 100%, if the resistance across terminals (R1) is 10 or less times the resistance across terminals before extension (R0) (R1/R0≦10), it can be said that "even when expanded/contracted, the change of electrically-conductive properties is small."

In the electrode, in addition to the above-mentioned elastomer and conductive filler, various additives may be blended. The additives include, for example, crosslinking agent, valcanization accelerator, processing aid, aging preventive agent, plasticizer, softening agent, coloring agent, and the like.

Further, in the electrostatic capacity-type sensor of the present invention, in order to detect the bending-deformation, it is desirable to arrange a restraint member for restraining an elastic deformation of a surface of at least one of a pair of electrodes, on that surface. The restraint member, which has insulation properties, and is elastically deformable, is not particularly limited. For example, there can be used resin films such as polyimide (PI), polyethylene (PE), polyethylene terephthalate (PET), and the like.

Further, the electrostatic capacity-type sensor of the present invention may be formed by forming sensor elements of the above-mentioned dielectric film and the above-mentioned pair of electrodes, and arranging the sensor elements on both respective sides of a plate-shaped, elastically bending-deformable reference member. The reference member, which has insulation properties, and is elastically deformable, is not particularly limited. For example, similar to the above-mentioned restraint member, there can be used resin films or resin plate such as polyimide (PI), polyethylene (PE), polyethylene terephthalate (PET), and the like. Further, it is desirable that restraint members for restraining an elastic deformation of respective surfaces of a pair of sensor elements are further arranged on the surfaces. The restraint member is described as above.

The electrostatic capacity-type sensor of the present invention can be manufactured, for example, in the following manner. First, an additive such as processing aid and valcanization accelerator is added to the elastomer for the dielectric film to be kneaded so as to form an elastomer composition. Thereafter, the elastomer composition is molded into sheet form, and the composition thus molded is packed into a mold, in which the composition is crosslinked under predetermined conditions to prepare a dielectric film. Then, an elastomer for electrodes, a conductive filler and an additive such as valcanization accelerator are dispersed and mixed in a solvent to form a coating material, and then, the coating material is molded into thin-film form to prepare an unvulcanized electrode. Then, the unvulcanized electrode is arranged on the pair of surfaces of the prepared dielectric film, and both the electrode and the dielectric film are pressed under predetermined conditions for vulcanization and adhering. Now, the dielectric film and the electrode may adhere to each other only by mutual adhesive power (tack). However, when the dielectric film and the electrode are vulcanized to adhere to each other, the adhesion of both the materials is improved, thereby further improving the durability. Further, when the reference member and the restraint member are arranged, it is sufficient that they are allowed to adhere to the electrode surface by an adhesive and the like.

PREFERRED EMBODIMENTS

Hereinafter, examples of preferred embodiments of the electrostatic capacity-type sensor of the present invention will be explained. Further, embodiments of the electrostatic capacity-type sensor of the present invention are not limited to the present embodiments. The embodiments can be embodied with various modified aspects and improved aspects that the person skilled in the art can perform.

(1) First Embodiment

Figure 2:
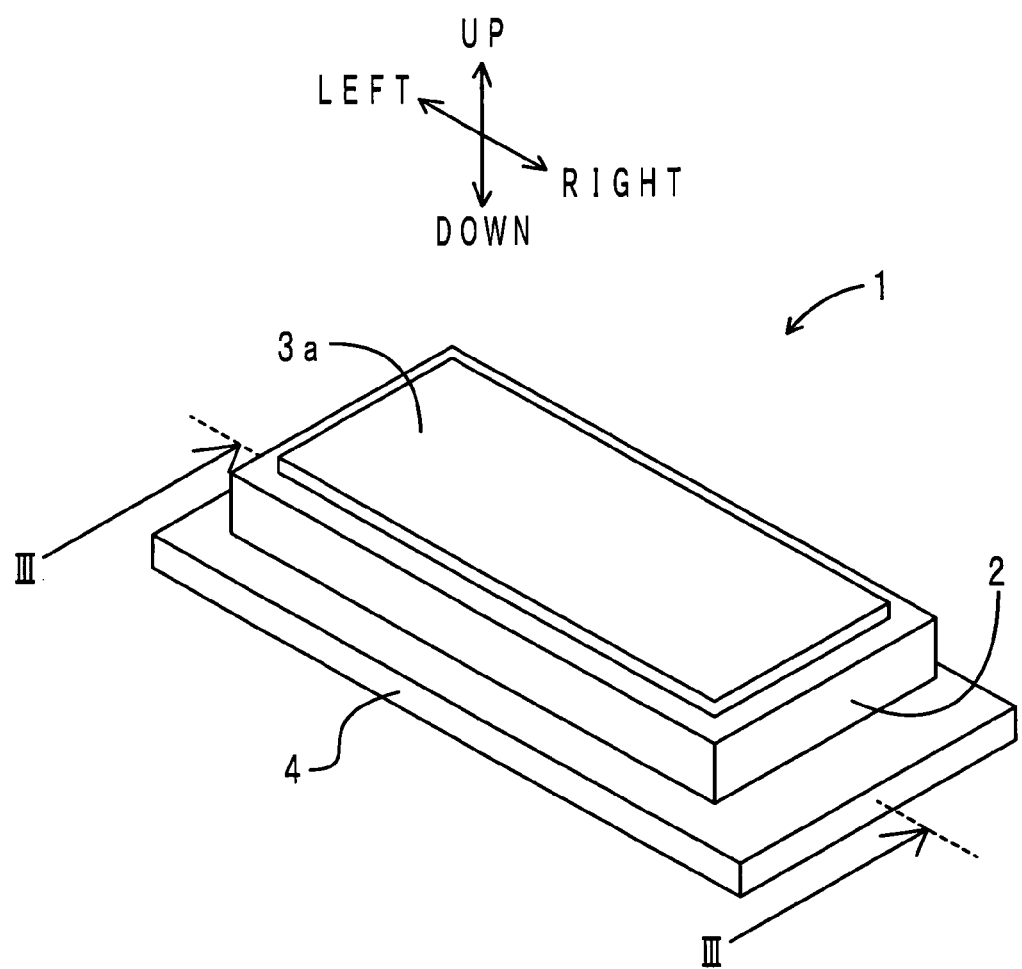
FIG. 2 is a perspective view of an electrostatic capacity-type sensor of a first embodiment of the present invention.
Figure 3:
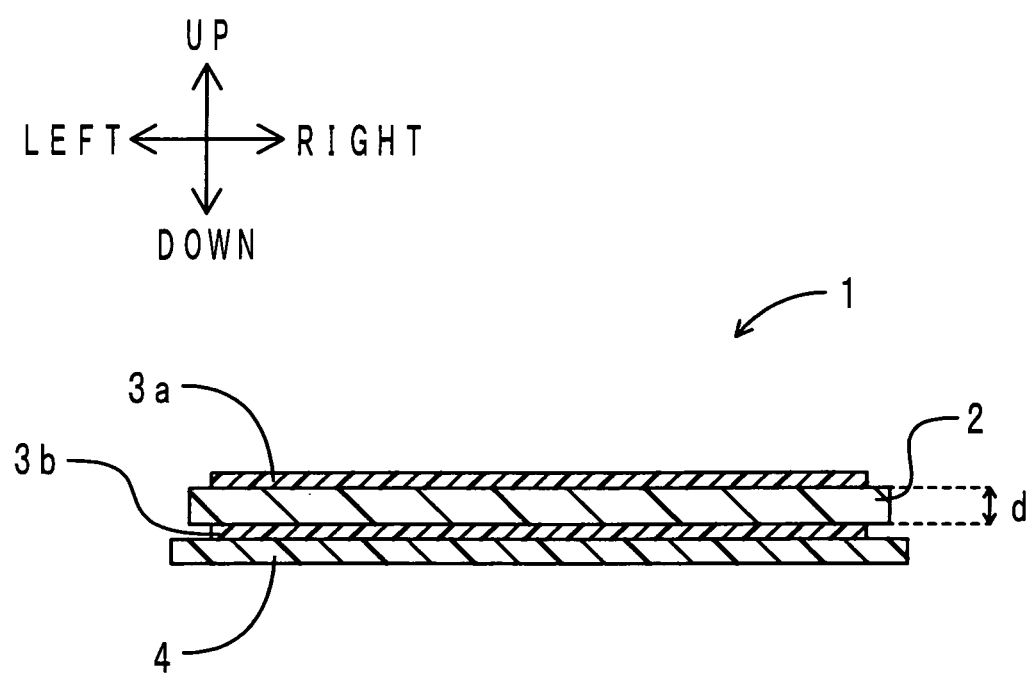
FIG. 3 is a sectional view taken along the line III-III of FIG. 2.

First, the construction of the electrostatic capacity-type sensor of the first embodiment will be explained. FIG. 2 shows a perspective view of an electrostatic capacity-type sensor. FIG. 3 shows a sectional view taken along the line of FIG. 2. As shown in FIGS. 2 and 3, an electrostatic capacity-type sensor 1 comprises a dielectric film 2, a pair of electrodes 3a, 3b, and a restraint member 4.

The dielectric film 2 is made of acrylic rubber, and assumes a band shape extending horizontally. A film thickness d of the dielectric film 2 is about 200 μm. The dielectric film 2 is arranged via the electrode 3b on the upper side of the restraint member 4 later described.

The pair of electrodes 3a, 3b assume a band shape extending horizontally. Of the electrodes 3a, 3b, the electrode 3a is arranged on the upper side of the dielectric film 2. The electrode 3b is arranged on the under side of the dielectric film 2. Each of the electrodes 3a, 3b is vulcanized with the dielectric film 2 to adhere to each other. The electrodes 3a, 3b are connected with lead wires (whose views are omitted). The electrodes 3a, 3b are formed of an elastomer composite material in which a ketjen black (average particle diameter 40 μm) is blended. The packing rate of the ketjen black in the electrodes 3a, 3b is 15 vol % assuming that the volume of each of the electrodes 3a, 3b is 100 vol %. Further, in the percolation curve of an elastomer composition in which acrylic rubber is mixed with the ketjen black, the critical volume fraction ($\phi c$) is about 4 vol %, and the saturated volume fraction ($\phi s$) is about 15 vol %.

The restraint member 4 is made of polyimide, and assumes a band shape extending horizontally. The restraint member 4 is fixed to the under side of the electrode 3b by an adhesive.

Figure 4:
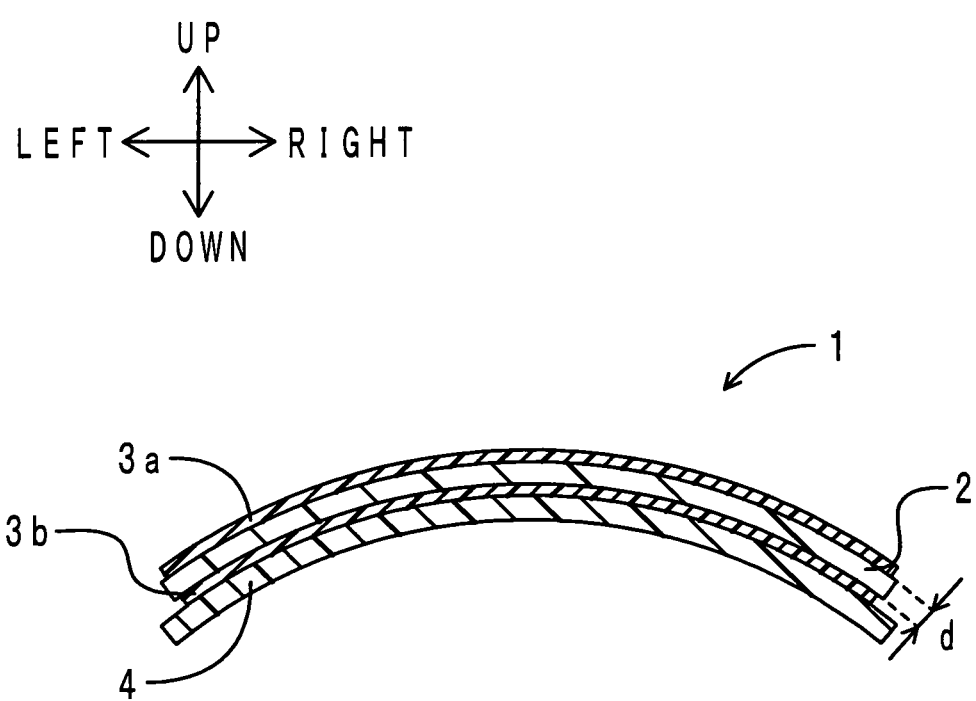
FIG. 4 is a sectional view of the electrostatic capacity-type sensor during bending-deformation (equivalent to the sectional view taken along the line III-III of FIG. 2).

Then, there will be explained the motion of the electrostatic capacity-type sensor 1 when the electrostatic capacity-type sensor 1 is deformed upward by bending, that is, when it is deformed by bending into a C letter-shape opening downward. FIG. 4 shows a sectional view of the electrostatic capacity-type sensor during bending-deformation (equivalent to the sectional view taken along the line III-III of the previously shown FIG. 2).

As shown in FIG. 4, when the electrostatic capacity-type sensor 1 is deformed upward by bending, the dielectric film 2, the pair of electrodes 3a, 3b, and the restraint member 4 are integrally bent into a C letter-shape opening downward. This causes the dielectric film 2 to be compressed vertically, thereby making the film thickness d smaller. As a result, the capacitance between the electrodes 3a and 3b becomes large. The change in capacitance causes the bending-deformation to be detected.

Then, there will be explained an action and an effect of the electrostatic capacity-type sensor 1 of this embodiment. When the electrostatic capacity-type sensor 1 of this embodiment is deformed by bending, the capacitance becomes large. The change in capacitance allows the bending-deformation to be easily detected. Further, the dielectric film 2 and the electrodes 3a, 3b are formed of an elastomer (acrylic rubber), so that the electrostatic capacity-type sensor 1 is flexible and has an excellent processability. Hence, it has a high degree of freedom with respect to arranged locations. Further, it is flexible, so that it can cope with a large deformation amount, and thus provides a large detection range. Further, the dielectric film 2 made of acrylic rubber having a high specific dielectric constant is arranged between the pair of electrodes 3a and 3b, so that the capacitance is larger and the detection sensibility is higher compared to those of the electrodes oppositely arranged simply via a space. Further, the pair of electrodes 3a and 3b are expansible/contractible, so that even when deformed by bending, they can follow the deformation of the dielectric film 2 to be deformed. Thus, even when used repeatedly, the pair of electrodes 3a, 3b and the dielectric film 2 are difficult to be separated from each other, so that they are excellent in durability. Further, the restraint member 4 is arranged on the under side of the electrode 3b, so that the elastic deformations of the electrode 3b and the under side of the dielectric film 2 are restricted. This causes the film thickness d during deformation by bending, that is, a change in the distance between the electrodes 3a and 3b to become large. Hence, the deformation by bending is more easily detected.

(2) Second Embodiment

Figure 5:
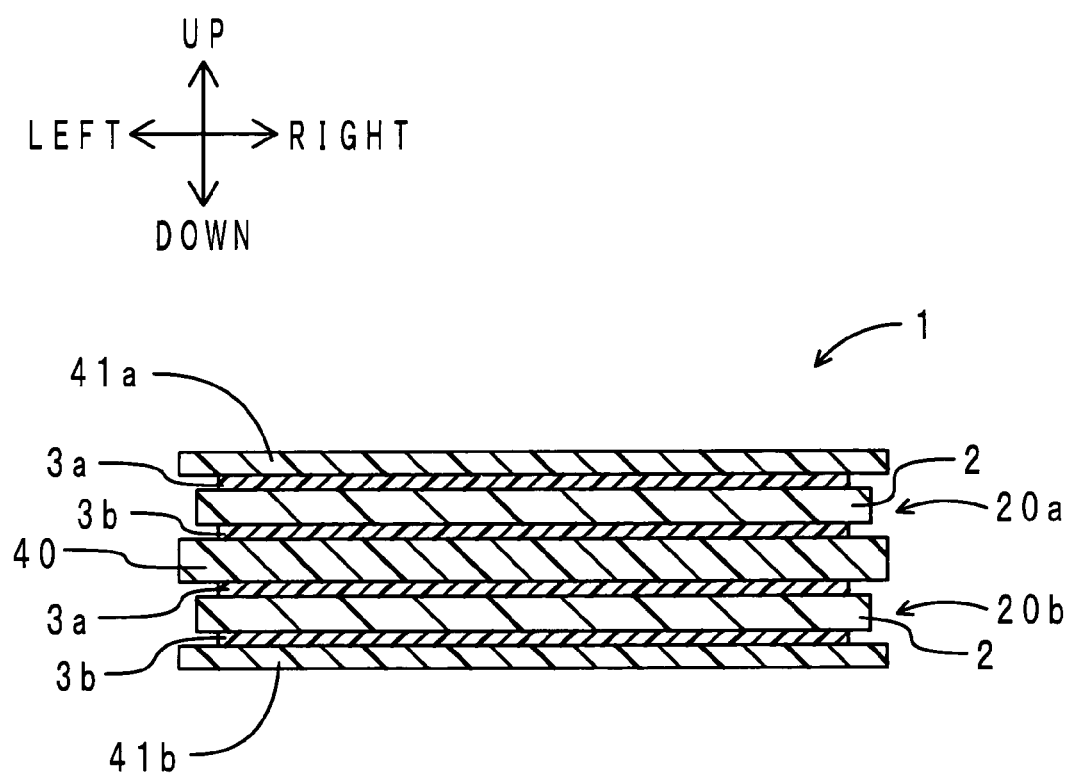
FIG. 5 is a sectional view of an electrostatic capacity-type sensor of a second embodiment of the present invention.

First, the construction of the electrostatic capacity-type sensor of the second embodiment will be explained. FIG. 5 shows a sectional view of an electrostatic capacity-type sensor of this embodiment. As shown in FIG. 5, the electrostatic capacity-type sensor 1 comprises a pair of sensor elements 20a, 20b, a reference member 40, and restraint members 41a, 41b.

The reference member 40 is made of polyimide, and assumes a band shape extending horizontally. The sensor element 20a and the sensor element 20b are arranged above and below of the reference member 40, respectively.

Each of the pair of sensor elements 20a, 20b consists of the dielectric film 2 and the pair of electrodes 3a, 3b. The dielectric film 2 and the pair of electrodes 3a, 3b are the same as those in the first embodiment, so that the explanation thereof is omitted. The sensor element 20a is arranged such that the electrode 3b contacts the upper side of the reference member 40. The electrode 3b of the sensor element 20a and the upper side of the reference member 40 are fixed to each other by an adhesive. The sensor element 20b is arranged such that the electrode 3a contacts the under side of the reference member 40. The electrode 3a of the sensor element 20b and the under side of the reference member 40 are fixed to each other by an adhesive.

Each of the restraint members 41a, 41b is made of polyimide, and assumes a band shape extending horizontally. The restraint member 41a is fixed to the upper-side of the electrode 3a of the sensor element 20a by an adhesive. Similarly, the restraint member 41b is fixed to the under-side of the electrode 3b of the sensor element 20b by an adhesive.

Figure 6A:
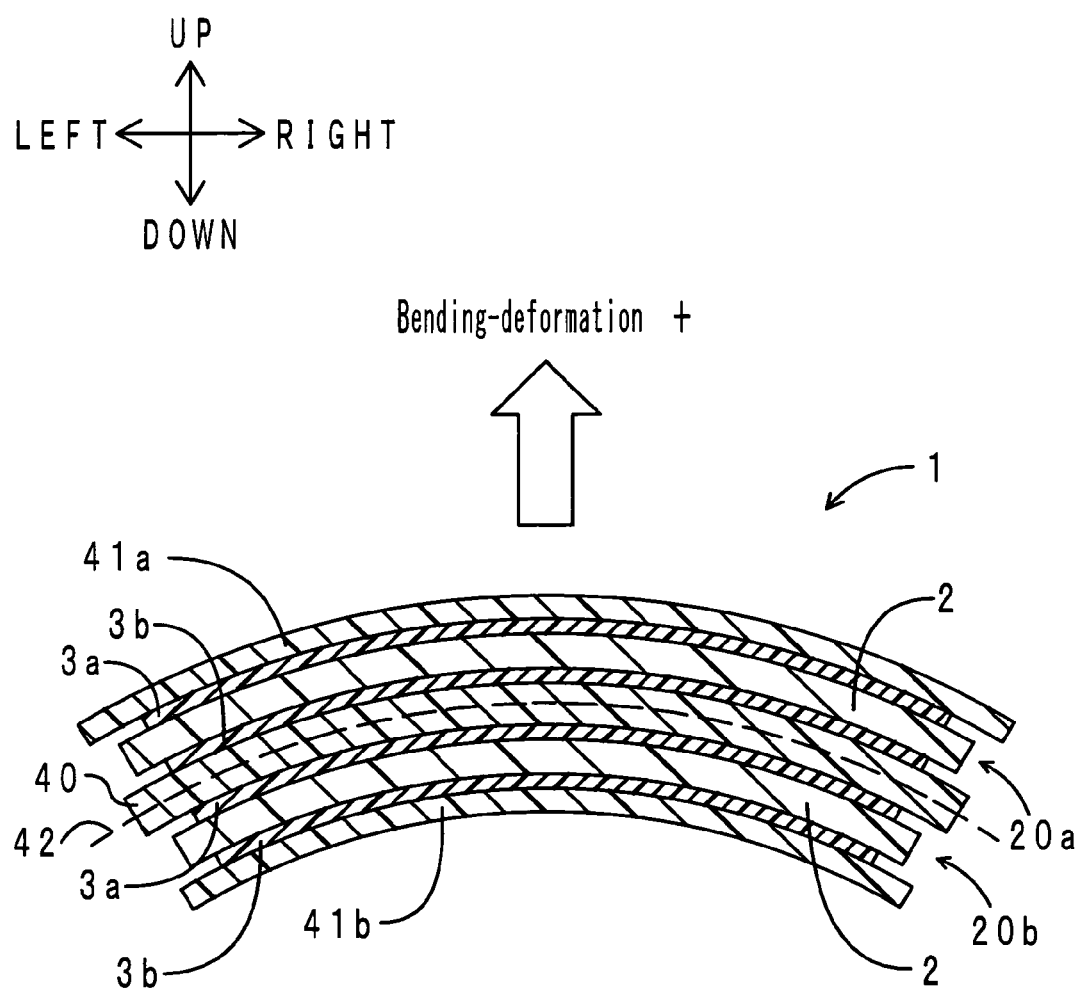
FIG. 6a is a sectional view of the electrostatic capacity-type sensor during bending-deformation in the upward (+) direction.
Figure 6B:
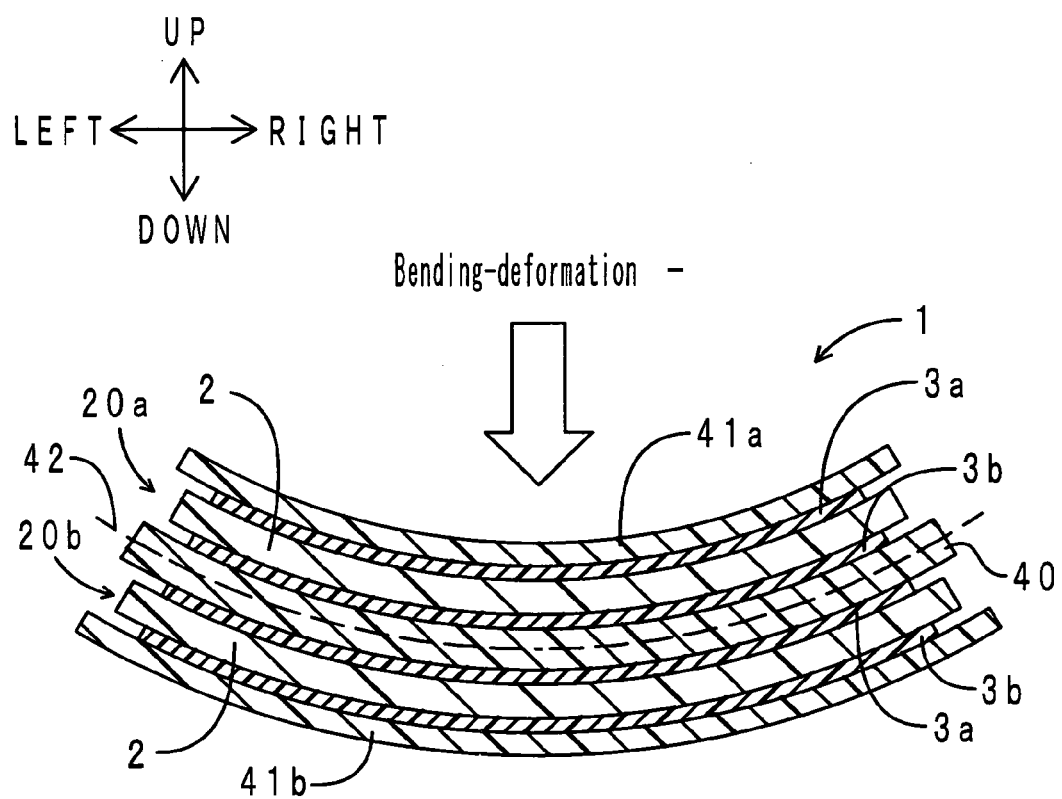
FIG. 6b is a sectional view of the electrostatic capacity-type sensor during bending-deformation in the downward (−) direction.

Then, there will be explained the motion of the electrostatic capacity-type sensor 1 when the electrostatic capacity-type sensor 1 is deformed by bending. FIG. 6a is a sectional view of the electrostatic capacity-type sensor during bending-deformation in the upward (+) direction. FIG. 6b is a sectional view of the electrostatic capacity-type sensor during bending-deformation in the downward (−) direction. As shown in FIG. 6a, when the electrostatic capacity-type sensor 1 is bending-deformed upwardly such that the center in the film thickness direction (vertical direction) of the section of the reference member 40 becomes a neutral axis 42 with respect to stress, the reference member 40, the sensor elements 20a, 20b, and the restraint members 41a, 41b are integrally bent into a C letter-shape opening downwardly. Neither the compressive stress nor the tensile stress acts on the horizontal plane of the reference member 40 having the neutral axis 42. Now, the sensor element 20a is compressed vertically. Hence, the film thickness of the dielectric film 2 becomes small, and the capacitance between the electrodes 3a and 3b becomes large. On the other hand, a tensile stress is applied to the sensor element 20b. Hence, the film thickness of the dielectric film 2 becomes large, and the capacitance between the electrodes 3a and 3b becomes small.

Further, as shown in FIG. 6b, when the electrostatic capacity-type sensor 1 is bending-deformed downwardly such that the center in the film thickness direction (vertical direction) of the section of the reference member 40 becomes a neutral axis 42 with respect to stress, the reference member 40, the sensor elements 20a, 20b, and the restraint members 41a, 41b are integrally bent into a C letter-shape opening upwardly. Similarly to that mentioned above, neither the compressive stress nor the tensile stress acts on the horizontal plane of the reference member 40 having the neutral axis 42. Now, a tensile stress is applied to the sensor element 20a. Hence, the film thickness of the dielectric film 2 becomes large, and the capacitance between the electrodes 3a and 3b becomes small. On the other hand, the sensor element 20b is compressed vertically. Hence, the film thickness of the dielectric film 2 becomes small, and the capacitance between the electrodes 3a and 3b becomes large. Table 1 shows collectively respective changes (increase: +, decrease: −) in the film thickness of the dielectric film 2 of the sensor elements 20a, 20b.

TABLE 1

|  | Bending-deformation (Upward direction +) | Bending-deformation (Downward direction −) |
|---|---|---|
| (1) Sensor element 20a | Compressive − | Tensile + |
| (2) Sensor element 20b | Tensile + | Compressive − |
| (1) − (2) | −− | ++ |

As shown in Table 1, on both the sides of the reference member 40 (upper-side: sensor element 20a, under-side: sensor element 20b), the increase/decrease in the film thickness of the dielectric film 2 is reverse with respect to the bending-deformation. That is, the sensor elements 20a, 20b have a symmetry relationship with the reference member 40. Now, assuming that a change in the capacitance of the sensor element 20a is $\Delta C_a$, and a change in the capacitance of the sensor element 20b is $\Delta C_b$, during bending-deformation, even when changes in the electrostatic capacity of respective sensor elements 20a, 20b are small, the bending-deformation can be surely detected based on the value of "$\Delta C_a - \Delta C_b$."

Then, there will be explained an action and an effect of the electrostatic capacity-type sensor 1 of this embodiment. In the electrostatic capacity-type sensor 1 of this embodiment, the parts common to those of the electrostatic capacity-type sensor of the first embodiment exhibit the same action and effect as the electrostatic capacity-type sensor of the first embodiment. Further, according to the electrostatic capacity-type sensor 1 of this embodiment, the bending-deformation is detected based on the difference between the change in the electrostatic capacity in the sensor element 20a ($\Delta C_a$) and the change in the electrostatic capacity in the sensor element 20b ($\Delta C_b$), whereby the detection sensibility can be improved.

Thus, the electrostatic capacity-type sensor 1 of this embodiment has a high sensibility and provides little malfunction and erroneous discrimination. Further, the restraint members 41a and 41b are arranged on the surface of the sensor elements 20a and 20b, respectively. Hence, the change in the film thickness of the dielectric film 2 during bending-deformation becomes larger, so that the bending-deformation is easily detected.

Further, although the restraint members 41a and 41b are arranged in this embodiment, an aspect in which the restraint members 41a and 41b are not arranged may be embodied. In this case, a cover film made of an insulating material may be arranged such that it covers the whole of the reference member 40, and sensor elements 20a, 20b. Covering the externally-exposed electrodes 3a, 3b with the cover film allows the surface of the electrostatic capacity-type sensor 1 to be an insulator, and the weather resistance to be effectively improved. As a cover film, an elastically-deformable and flexible elastomer-thin-film and the like are suitable. Further, when the restraint members 41a and 41b are arranged, the material and thickness of the reference member 40 may be the same as or different from those of the restraint members 41a and 41b.

EXAMPLES

Then, with an example, the present invention will be more specifically explained. Using the electrostatic capacity-type sensor 1 of the above-mentioned first embodiment (see FIGS. 2 and 3), the response properties to various deformations have been evaluated. Further, the electrostatic capacity-type sensor 1 has been prepared in the following manner. First, the dielectric film has been prepared. That is, 100 parts by weight (hereafter, abbreviated as parts) of acrylic rubber (made by Nippon Zeon Co., Ltd. "NIPPOLE (trademark) AR51"), 1 part of stearic acid as processing aid (made by Kao Corporation "LUNAC (trademark) S30"), 2.5 parts of zinc dimethylcarbamate as vulcanization accelerator (made by Ouchi Shinko Chemical Industrial Co., Ltd. "NOCCELAR (trademark) PZ"), and 0.5 parts of ferric dimetylcarbamate (made by Ouchi Shinko Chemical Industrial Co., Ltd. "NOCCELAR TTFE") have been mixed and dispersed in a roll kneader to prepare an elastomer composition. The elastomer composition thus prepared has been molded into a thin-sheet shape, and then packed into a mold, where the composition has been press crosslinked at 170° C. for about 30 minutes to obtain a thin film-shaped dielectric film.

Then, an unvulcanized electrode has been prepared. That is, 20 parts of ketjen black (made by Lion Corporation "KETJEN600JD", average particle diameter about 40 µm) as conductive filler, 2.5 parts of zinc dimethyl carbamate as vulcanization accelerator (same as above), and 0.5 parts of ferric dimethyl carbamate (same as above) have been added to a solution in which 100 parts of acrylic rubber (same as above) has been dissolved into a methyl ethyl ketone (MEK), and then the solution, to which chemicals have been added, has been mixed and dispersed in a dyno mill to obtain a coating material. The coating material has been molded into a thin-film shape by a bar coating method to obtain an unvulcanized electrode. Then, the unvulcanized electrode has been arranged on the surface of the pair of the dielectric films thus prepared, whereby the electrode and the dielectric films have been vulcanized and adhered to each other by pressing them at 170° C. for about 30 minutes.

(1) Response Properties to Bending-Deformation

Figure 7:
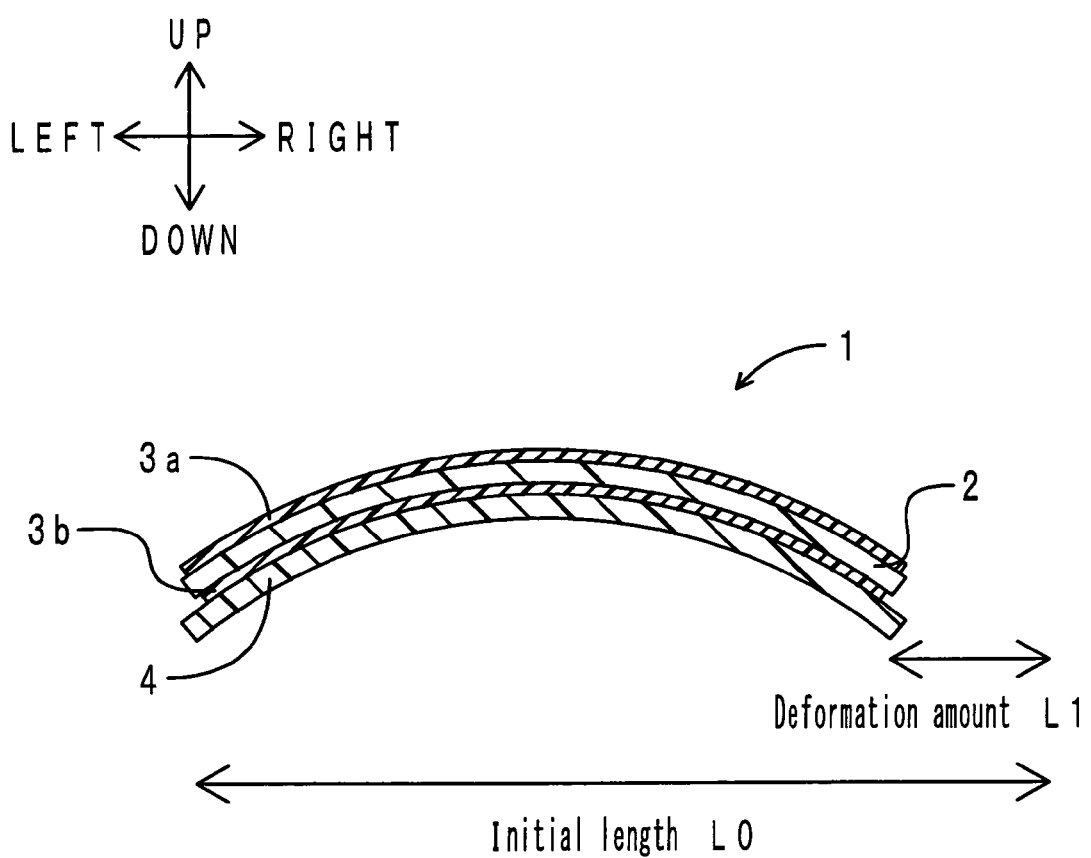
FIG. 7 is an explanatory view of the deformation amount L1 in the bending-deformation.
Figure 8:
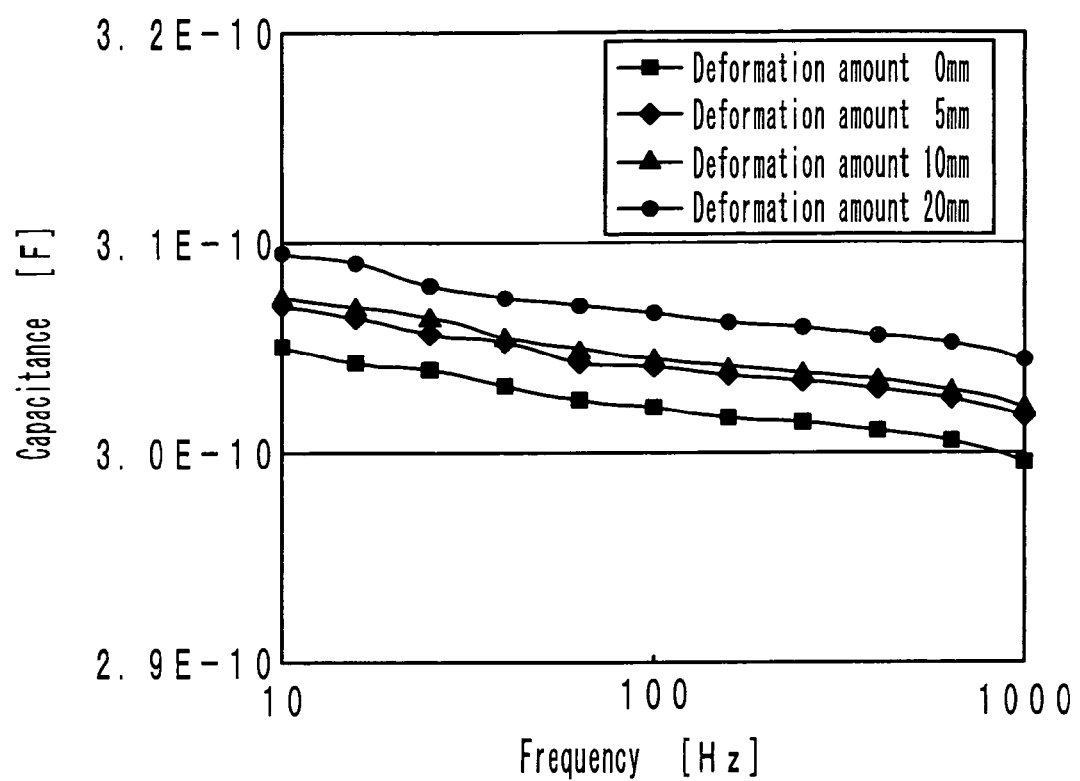
FIG. 8 is a graph showing a change in capacitance versus a frequency in the bending-deformation.
Figure 9:
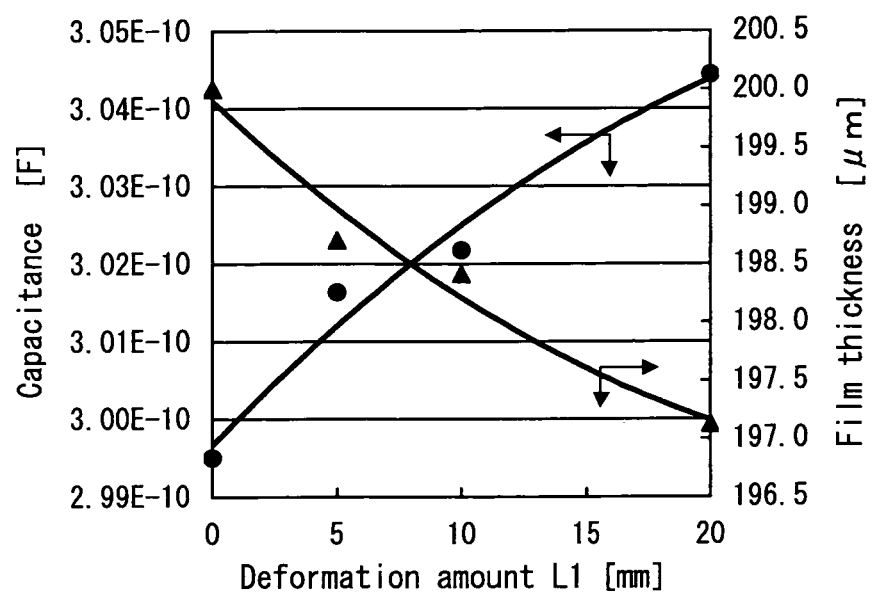
FIG. 9 is a graph showing a change in capacitance and film thickness (distance between electrodes) versus the deformation.

The above-mentioned electrostatic capacity-type sensor 1 has been bending-deformed to measure a change in the capacitance versus the deformation amount. In this test, the term "deformation amount" means a difference (L1) between the initial length L0 in the horizontal direction and the length during bending-deformation, as shown in FIG. 7. FIG. 8 shows a change in capacitance versus a frequency due to the difference in the deformation amount. In FIG. 8, "E-10" in the axis of ordinate means "$10^{-10}$" (same as that in the following figures). Thus, for example, "3.0E-10" indicates "$3.0 \times 10^{-10}$." As shown in FIG. 8, in any of frequencies 10 through 1000 Hz, the capacitance became larger with the increase of the deformation amount. Further, FIG. 9 shows a change in capacitance and film thickness (distance between electrodes) versus the deformation amount. Further, the film thickness in FIG. 9 is a calculated value calculated from the above-mentioned equation (I), "$C = \varepsilon_0 \varepsilon_r S/d$" assuming that a change in capacitance is based on a uniform change in film thickness of the dielectric film. From FIG. 9, it is understood that with the increase of the deformation amount, the film thickness becomes small, while the capacitance becomes large.

From the above, according to the electrostatic capacity-type sensor of the present invention, it has been confirmed that the bending-deformation can be detected. Further, even when the bending-deformation has been repeated, the dielectric film has not been separated from the electrode, expanding/contracting with the dielectric film. This has confirmed that the electrostatic capacity-type sensor of the present invention is excellent in durability.

(2) Response Properties to Compressive Deformation

Figure 10:
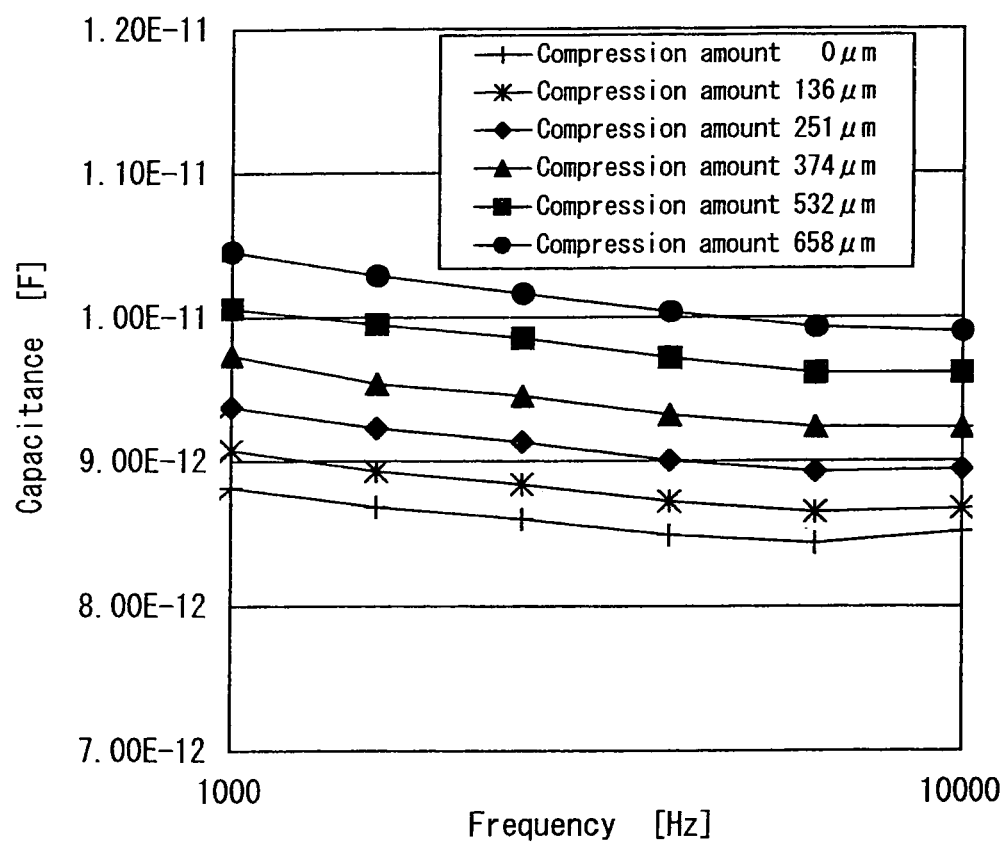
FIG. 10 is a graph showing a change in capacitance versus a frequency during the compressive deformation.
Figure 11:
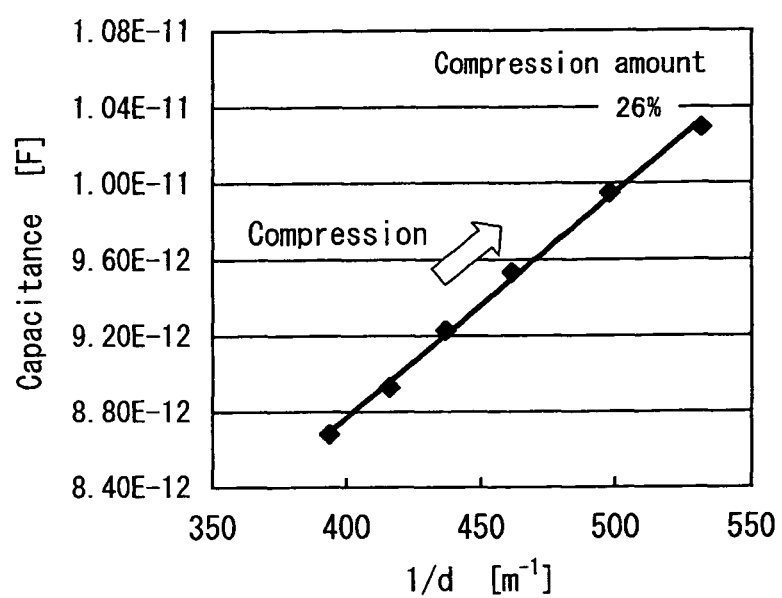
FIG. 11 is a graph showing a relationship between an inverse number of the film thickness (1/d) and a capacitance.

Using an electrostatic capacity-type sensor formed similar to the above-mentioned electrostatic capacity-type sensor 1 other than that the thickness of the dielectric film has been changed to about 2.5 mm, there has been measured a change in capacitance versus the film thickness (distance between electrodes) during compressive deformation. In this test, the sensor has been compressed from the upper side such that the film thickness of the dielectric film has become uniformly small on the whole surface thereof. The larger the compression amount, the smaller the film thickness becomes. FIG. 10 shows a change in capacitance versus a frequency due to the difference in the compression amount. As shown in FIG. 10, in any of frequencies 1000 through 10000 Hz, the capacitance became larger with the increase of the compression amount. Further, FIG. 11 shows a relationship between an inverse number of the film thickness (1/d) and a capacitance. As shown in FIG. 11, linearity becomes valid between the inverse number of the film thickness (1/d) and the capacitance. That is, it is understood that the above-mentioned equation (I), "$C = \varepsilon_0 \varepsilon_r S/d$" holds in as wide a range of the compression amount as 0% through 26%. From the above, according to the electrostatic capacity-type sensor of the present invention, it has been confirmed that the compressive deformation and the compression amount can be detected.

(3) Response Properties as Impact Sensor

Figure 12:
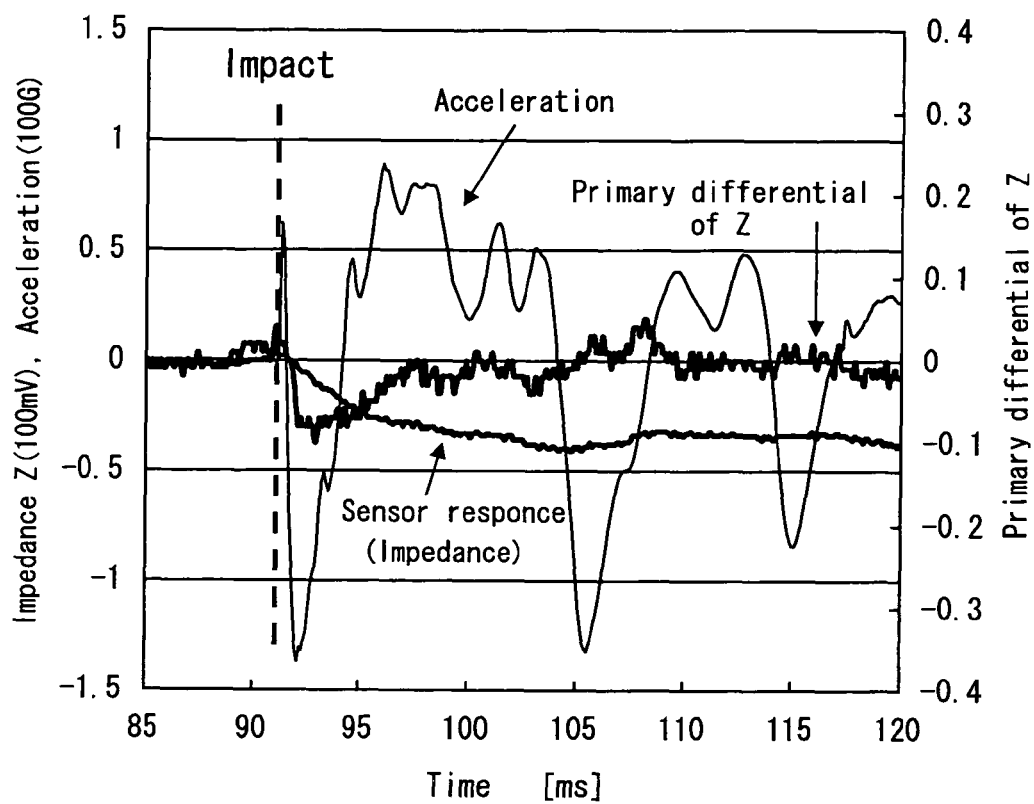
FIG. 12 is a graph showing a time-dependent change of the impedance and acceleration versus the impact.

By mounting the above-mentioned electrostatic capacity-type sensor 1 onto the under side of a bumper cover, the response properties to the impact from the surface of the bumper cover has been evaluated. The electrostatic capacity-type sensor 1 has been mounted by permitting the restraint member 4 to adhere to the under side of the bumper cover. Further, an acceleration sensor has been arranged near the center of the electrostatic capacity-type sensor 1 in the longitudinal direction. At the time when the surface of the bumper cover has been hit with a hammer to cause an impact to be applied thereto, the impedance and the acceleration have been measured. The results are shown in FIG. 12. In FIG. 12, the value of the primary differential of the change in impedance (Z) is collectively shown.

As shown in FIG. 12, the impedance has rapidly dropped with respect to the impact by the hammer. That is, the response delay to the impact is little, so that the response properties of the electrostatic capacity-type sensor of the present invention is high. Thus, the electrostatic capacity-type sensor of the present invention is useful for the detection of vehicle impact also in view of the speed of the response properties.

(4) Self-Temperature Compensating Function

Figure 13:
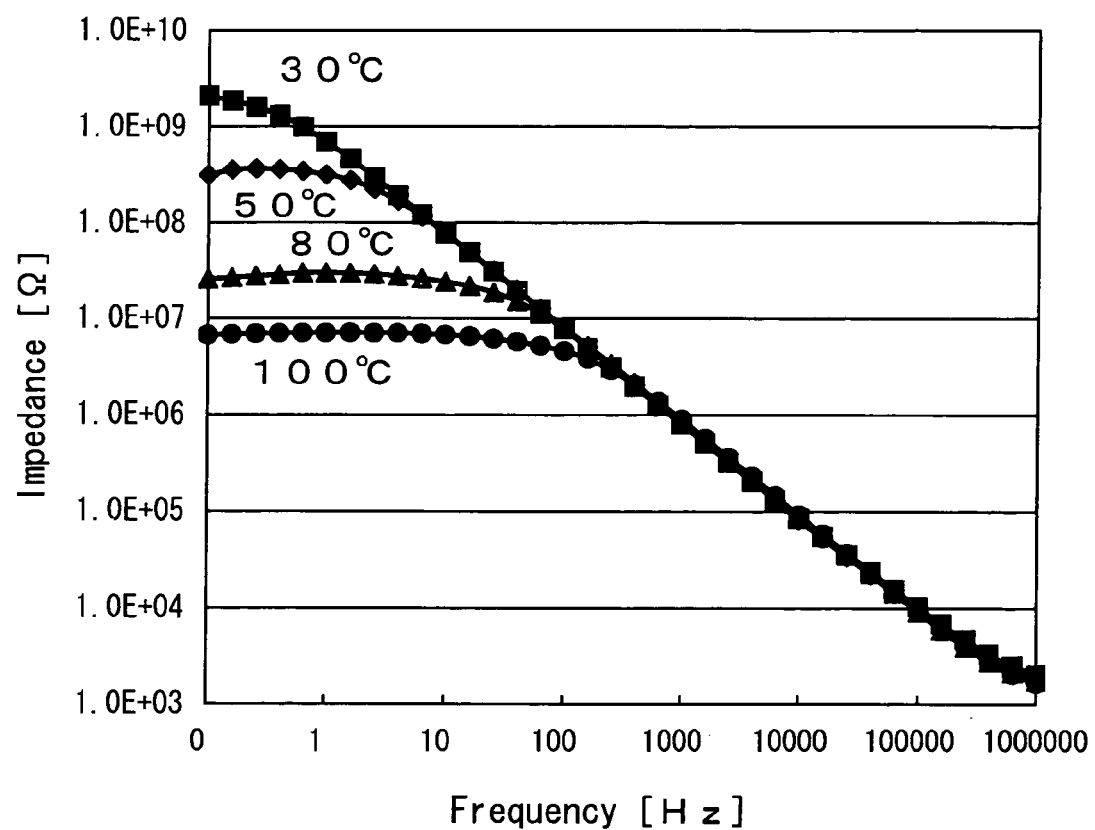
FIG. 13 is a graph showing a temperature dependence of the impedance.

For the above-mentioned electrostatic capacity-type sensor 1, the impedance has been measured at various temperatures 30° C., 50° C., 80° C., 100° C., thereby examining the temperature dependence of the impedance. The results are shown in FIG. 13. As shown in FIG. 13, with the rise of the temperature, the impedance has dropped in a low-frequency region. The reason is considered as follows.

Figure 14:
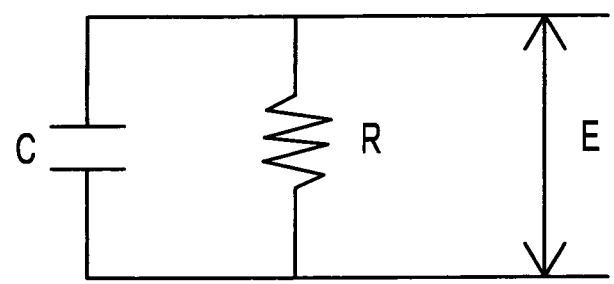
FIG. 14 shows an equivalent circuit of the electrostatic capacity-type sensor 1 and a calculation equation of the impedance (Z).

As shown in FIG. 14, when the electrostatic capacity-type sensor 1 is deemed as a parallel circuit of the direct-current resistance (R) and the capacitance (C), the impedance (Z) can be expressed as in the equation (II). As apparent from that in a high-frequency region, the impedance is changed depending on the frequency, the term ($\omega C$) based on the capacitance is dominant over the impedance, and thus an influence by the direct-current resistance R is little. On the other hand, in a low-frequency region, the impedance drops with the rise of temperature, and at the same time, a frequency region in which the impedance exhibits a constant value spreads wide. That is, the term of the direct-current resistance R having no frequency dependence shows a factor dominant over the impedance, and the drop of the impedance means the decrease of the direct-current resistance R. Thus, it is considered that the direct-current resistance R decreases due to the rise of temperature to cause the impedance in a low-frequency region to be lowered.

Figure 15:
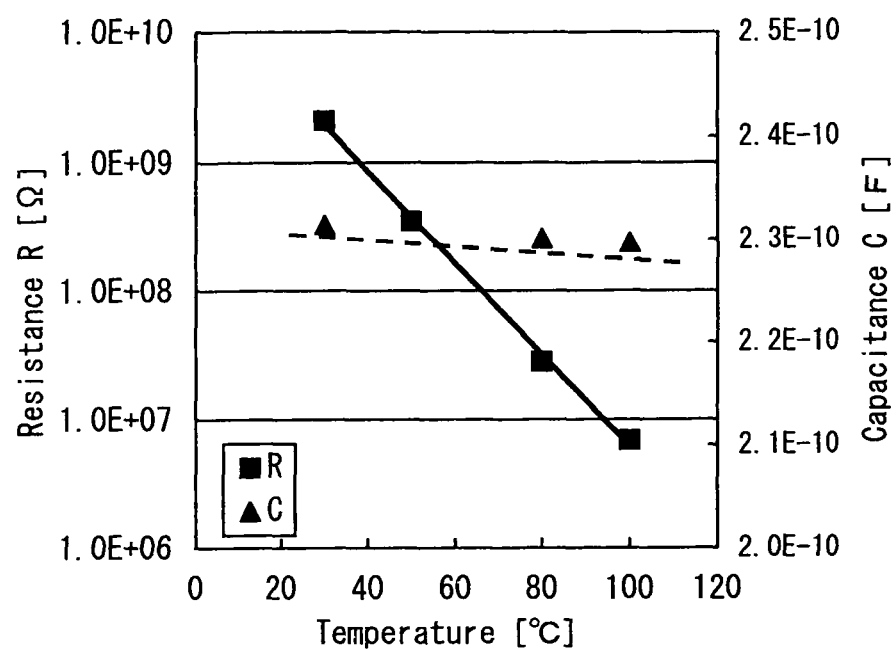
FIG. 15 is a graph showing calculated results of R and C versus temperature in a low-frequency range.

Now, FIG. 15 shows results from the R and the C determined by the regression analysis of FIG. 13. As shown in FIG. 15, in a low-frequency region, the proportional relationship between the temperature and the R is obtained. Thus, understanding the relationship between the temperature and the R in a low-frequency region allows the decrease in the capacitance C associated with the increase in the film thickness due to the thermal expansion of the elastomer (dielectric film) at a high temperature to be corrected. That is, according to the electrostatic capacity-type sensor of the present invention, the deformation can be precisely detected utilizing the self-temperature compensating function without depending on the temperature of working environment.

(5) Discrimination of Bending Direction

Figure 16:
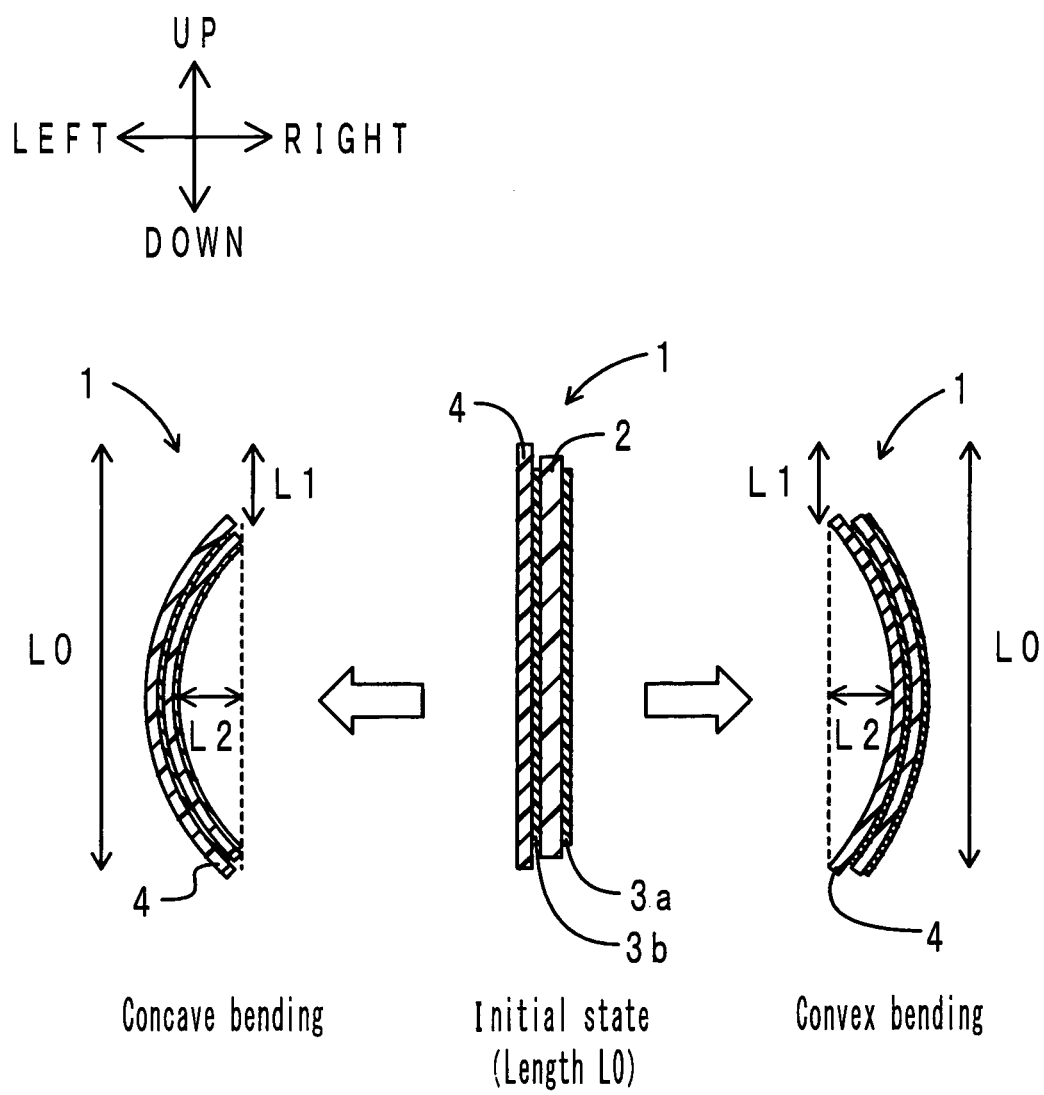
FIG. 16 is a pattern diagram of a test on the discrimination of bending direction.

The above-mentioned electrostatic capacity-type sensor 1 has been arranged such that the longitudinal direction thereof became vertical direction. Then, the sensor is permitted to be bent horizontally with respect to the restraint member 4, thereby measuring a change in the capacitance versus the deflection amount. FIG. 16 shows a pattern diagram of this test. As shown in FIG. 16, the electrostatic capacity-type sensor 1 has been permitted to be bent in the left direction and the right direction from the initial state (before deformation, the length: L0). Now, the bending-deformation in the left direction has been defined as the concave bending and that in the right direction as the convex bending. Further, the deflection amount L2 has been calculated from the equations (a) through (e) as shown in FIG. 17. That is, assuming that a state in which the electrostatic capacity-type sensor 1 having an initial length L0 has been curved by the bending-deformation is a part of a circle with a radius r (circular arc L0, angle at circumference 28), the equations (d) and (e) are derived. Now, substituting the measured values L0, L1 obtained from the test for the equation (e), the value of θ has been calculated, and then substituting the value of θ thus determined for the equation (d), the deflection amount L2 has been calculated.

Figure 18:
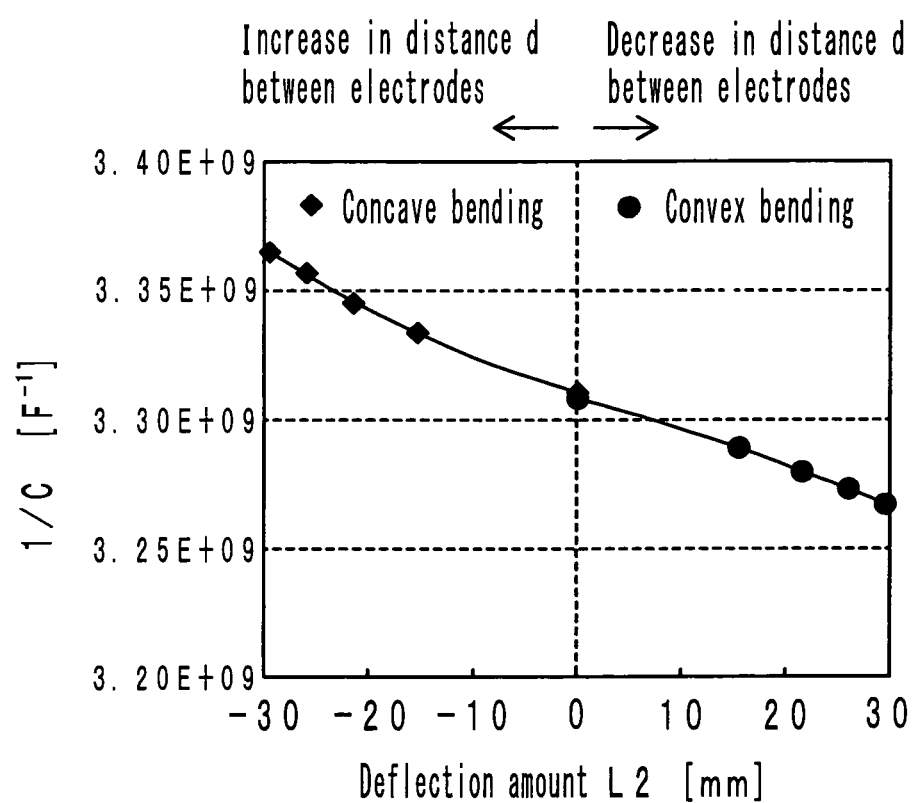
FIG. 18 is a graph showing a change in capacitance (1/C) versus the deflection amount.

FIG. 18 shows a change in capacitance (1/C) versus the deflection amount. In FIG. 18, the deflection amount in the convex bending is shown in a positive value, while that in the concave bending is shown in a negative value. As shown in FIG. 18, when the bending direction became reverse horizontally, the phenomenon of the change in capacitance versus the deflection amount became reverse. For example, it is considered that for the convex bending, a compressive stress is applied to the dielectric film 2, the distance between the electrodes became small with the increase of the deflection amount to cause the capacitance (C) to become large. On the other hand, it is considered that for the concave bending, a tensile stress is applied to the dielectric film 2, the film thickness (distance between the electrodes) became large with the increase of the deflection amount to cause the capacitance (C) to become small. In such a way, according to the electrostatic capacity-type sensor of the present invention, the direction and amount of deformation can be discriminated based on the phenomenon of the change in capacitance.

The electrostatic capacity-type sensor of the present invention can be applied to various applications including a face-pressure sensor for soft surface such as artificial skin, motion capture for detecting human motion, information input device such as keyboard, as well as sitting sensor, sensor for detecting vehicle crash, and face-pressure distribution sensor for bed.

What is claimed is:

1. An electrostatic capacity-type sensor comprising:
    a plate-shaped, elastically bending-deformable reference member; and
    a pair of elastically bending-deformable sensor elements arranged on both sides of said reference member, wherein:
    each of the sensor elements has a dielectric film made of an elastomer and a pair of electrodes arranged via said dielectric film;
    said pair of electrodes have an elastomer and a conductive filler blended in said elastomer, and are expansible/contractible depending on the deformation of said dielectric film, and exhibit a small change in the conductivity even when expanded and contracted;
    an elastic deformation of respective surface of one of said pair of electrodes in said sensor elements is restrained by said reference member; and
    utilizing a fact that the increase/decrease of the film thickness of said dielectric film on both the sides of said reference member becomes reverse during bending-deformation, said bending-deformation is detected based on a difference between an electrostatic capacity change in one of said sensor elements and an electrostatic capacity change in the other of said sensor elements.

2. An electrostatic capacity-type sensor according to claim 1, wherein restraint members for restraining an elastic deformation of respective surfaces of the other of said pair of electrodes in said sensor elements are further arranged on said surfaces.

3. An electrostatic capacity-type sensor according to claim 1, wherein said pair of electrodes comprises an elastomer composition including said elastomer and said conductive filler; and
    in a percolation curve indicating a relationship between a blending amount of said conductive filler and an electric resistance of said elastomer composition, the blending amount (critical volume fraction: φc) of said conductive filler at a first flexure point, at which electric resistance lowers to cause a transition between insulator and conductor, is 25 vol % or less.

4. An electrostatic capacity-type sensor according to claim 1, wherein said conductive filler is made of carbon material.

5. An electrostatic capacity-type sensor according to claim 1, wherein said elastomer of said dielectric film comprises one or more compounds selected from the group consisting of silicone rubber, acrylonitrile-butadiene copolymer rubber, acrylic rubber, epichlorohydrin rubber, chlorosulfonated polyethylene, chlorinated polyethylene, and urethane rubber.

6. An electrostatic capacity-type sensor according to claim 1, wherein said elastomer as a material of said pair of electrodes comprises one or more compounds selected from the group consisting of silicone rubber, ethylene-propylene copolymer rubber, natural rubber, styrene-butadiene copolymer rubber, acrylonitrile-butadiene copolymer rubber, acrylic rubber, epichlorohydrin rubber, chlorosulfonated polyethylene, chlorinated polyethylene, and urethane rubber.

* * * * *